United States Patent
Scholte-Wassink

(10) Patent No.: US 11,105,062 B2
(45) Date of Patent: Aug. 31, 2021

(54) METHODS FOR RETROFITTING A WIND TURBINE FOUNDATION AND WIND TURBINE FOUNDATIONS

(71) Applicant: General Electric Renovables España, S.L., Barcelona (ES)

(72) Inventor: Hartmut Scholte-Wassink, Salzbergen (DE)

(73) Assignee: General Electric Renovables España, S.L., Barcelona (ES)

( * ) Notice: Subject to any disclaimer, the term of this patent is extended or adjusted under 35 U.S.C. 154(b) by 0 days.

(21) Appl. No.: 16/986,538

(22) Filed: Aug. 6, 2020

(65) Prior Publication Data

US 2021/0047797 A1  Feb. 18, 2021

(30) Foreign Application Priority Data

Aug. 12, 2019  (EP) .................................... 19382709

(51) Int. Cl.
| | | |
|---|---|---|
| E02D 5/64 | (2006.01) | |
| E02D 5/60 | (2006.01) | |
| E02D 37/00 | (2006.01) | |
| F03D 13/20 | (2016.01) | |
| E02D 5/24 | (2006.01) | |
| E02D 7/02 | (2006.01) | |

(52) U.S. Cl.
CPC .............. *E02D 37/00* (2013.01); *E02D 5/24* (2013.01); *E02D 5/60* (2013.01); *E02D 5/64* (2013.01); *E02D 7/02* (2013.01); *F03D 13/20* (2016.05); *E02D 2200/1685* (2013.01); *F05D 2230/80* (2013.01)

(58) Field of Classification Search
CPC ... E02D 5/60; E02D 5/64; F03D 13/20; F05B 2230/80; F05D 2230/80
USPC .................................................. 405/211–216
See application file for complete search history.

(56) References Cited

U.S. PATENT DOCUMENTS 4,697,959 A * 10/1987 Kinnan ............... E04H 12/2292
                                                            175/394
2017/0247899 A1  8/2017 Faries et al.

FOREIGN PATENT DOCUMENTS

| CN | 106555390 A | | 4/2017 |
| DE | 452498 C | | 11/1927 |
| GB | 2505192 A | * | 2/2014 |
| WO | WO2018/133964 A1 | | 7/2018 |

OTHER PUBLICATIONS

European Search Report Corresponding to EP19382709 dated Feb. 11, 2020.

* cited by examiner

*Primary Examiner* — Sunil Singh
(74) *Attorney, Agent, or Firm* — Dority & Manning, P.A.

(57) ABSTRACT

A method for retrofitting a wind turbine foundation is provided. The foundation comprises a first substantially elongated pile (31) in the ground. The method further comprises: arranging a lower end of an elongated channel (41) of a second substantially elongated pile (40) around the first pile (31), wherein the elongated channel (41) extends substantially along a longitudinal direction of the second pile (40), wherein the channel (41) is configured to receive at least a portion of the first pile. The method further comprises lowering the second pile (40) such that the elongated channel (41) surrounds at least a portion of the first pile (31). Finally, the second pile (40) is driven into the ground (35).

12 Claims, 8 Drawing Sheets

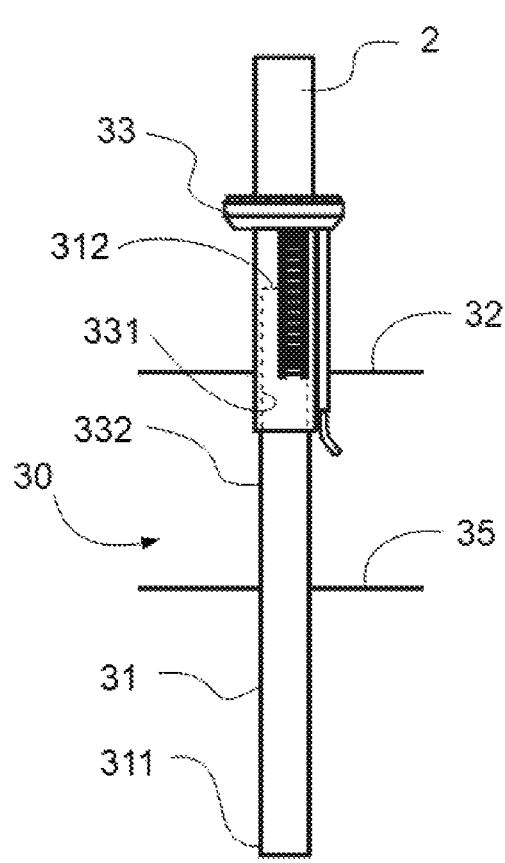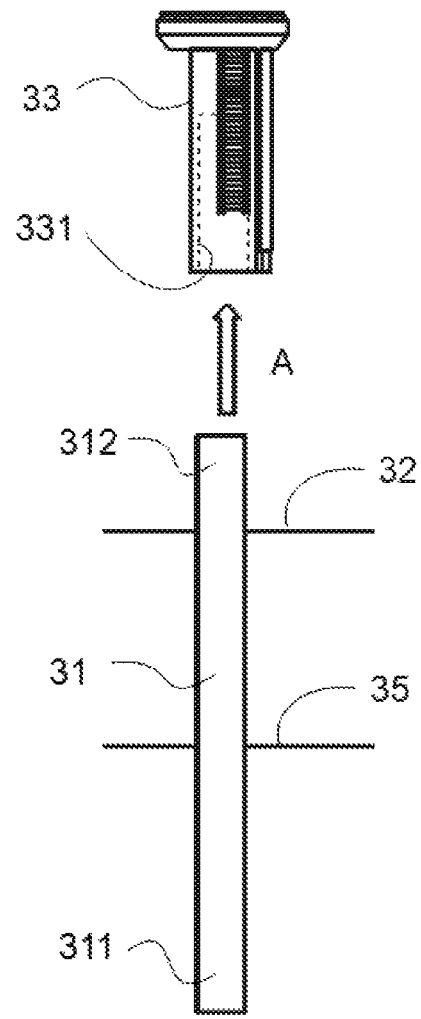
Figure 3                    Figure 4

METHODS FOR RETROFITTING A WIND TURBINE FOUNDATION AND WIND TURBINE FOUNDATIONS

The present disclosure relates to methods for retrofitting a wind turbine foundation. The present disclosure further discloses foundations for wind turbines and wind turbines comprising such foundations.

BACKGROUND

Wind turbines are generally regarded as an environmentally safe and desirable source of renewable energy. In summary, a wind turbine harnesses the kinetic energy of wind and transforms this kinetic energy into electrical energy. To maximize the efficacy of power generation and to simplify connection to a power grid, several wind turbines are often located in proximity to one another in what is generally referred as "wind farms". Particularly, these wind farms may be located in regions having relatively strong winds, such as, for example, at offshore locations.

Offshore foundations may be fixed or floating. In floating wind turbines, the wind turbine is mounted on a floating structure which is anchored to the seabed through a plurality of cables. Spar-buoy or tension leg platform wind turbines may be examples of floating wind turbines. In fixed foundations, the wind turbine foundation is connected to the ground. Examples of fixed foundations may be jackets or monopiles. Jacket are truss-like lattice structures of steel profiles. These steel profiles may be welded or bolted. Accordingly, manufacturing of jackets may be time-consuming.

A monopile is a foundation structure for a wind turbine at an offshore location comprising a single pile. This pile may generally have a long cylindrical caisson or tube that is driven into the seabed. The pile is secured to the seabed through the friction between the pile and the seabed along the portion of the pile buried into the seabed. The pile may be formed by the assembly of different sections in an onshore location. The pile may be subsequently driven to the required penetration depth at the turbine's offshore location. Using the pile as a foundation structure may be advantageous because the same heavy lift equipment may be used for both driving the pile, and the installation of the wind turbines, thus facilitating an assembly line type of operation involving relatively few and standardized operations. Monopiles foundations may also be used in onshore locations.

The pile may be provided with a transition piece attached to the top of the pile for mounting a wind turbine. Methods to mount the transition piece on the pile may include grouting, swaging, or in-situ welding. In summary, the transition piece provides a mating surface to which a lower portion of wind turbine tower may be attached, e.g. bolted.

Selecting an appropriate wind turbine site is key to the success of any wind turbine project, financially and technically. For example, it is important to consider wind turbine locations with an appropriate wind class and a relatively low amount of wind shear among others. However, typically the best offshore or onshore wind turbines sites have already been used. In offshore locations, such wind farms may include "old" wind turbines i.e. wind turbines which in most cases have been rendered obsolete with a relatively low nominal power of e.g. 1.5-3 MW. These old wind turbines may reach the end of their lifetime. When the wind turbines need to be decommissioned, the wind turbines are removed from their foundations and the foundations may need to be removed from the seabed as well. This can be a costly procedure.

Moreover, modern wind turbines are configured to generate larger amounts of electrical power than older wind turbines. However, the modern wind turbines with a higher nominal power require a higher wind speeds to achieve this higher nominal power.

The present disclosure therefore provides methods and systems for re-using wind farm sites in. offshore or onshore wind turbine sites.

SUMMARY

According to one aspect, a method for retrofitting a wind turbine foundation is provided. The wind turbine foundation comprises a first substantially elongated pile in the ground. The method comprises arranging a lower end of an elongated channel of a second substantially elongated pile around the first pile, wherein the elongated channel extends substantially along a longitudinal direction of the second pile, and wherein the elongated channel is configured to receive at least a portion of the first pile. The method further comprises lowering the second pile such that the elongated channel surrounds at least a portion of the first pile and driving the second pile into the ground.

According to this first aspect, the second pile may be lowered such that the elongated channel surrounds at least a portion of the first pile (forming part of a previously installed wind turbine foundation) Then, the second pile is driven into the ground. In this respect, the second hollow pile may be suitable to support relatively new and powerful wind turbines configured to produce a large amount of electrical power (as compared with less efficient wind turbines which may be previously installed over the first pile).

Moreover, the second pile (and thus a corresponding wind turbine supported by the second pile) is installed in a previously used location for wind turbines i.e. the location corresponding to the first pile which is likely to e.g. have the best wind and soil conditions. Additionally, by installing the second piles in a previously installed foundation, the investment required is reduced given that part of the existing installations, accesses, geotechnical studies, expropriations, licenses and so forth may be at least partially re-used and thus the economical investment to install more powerful wind turbines is reduced.

Additionally, since the second pile is arranged around the previously installed first pile, the cost to decommission the previously installed pile may be avoided.

In summary, the installation of a second hollow pile around a first pile forming part of a previously installed foundation can provide a cost-effective, efficient and relatively easy-to-implement solution to install newer and more powerful wind turbines in optimal off-shore wind turbine locations.

According to a further aspect, a wind turbine foundation for a wind turbine is provided. The wind turbine foundation comprises a first elongated pile and a second elongated pile, a bottom end of the first elongated pile and a bottom end of the second elongated pile being arranged in a seabed. The second elongated pile surrounds the first elongated pile.

According to this aspect, a wind turbine foundation comprising a second pile, surrounding the first pile, in which relatively powerful wind turbines can be installed is provided. Moreover, the second pile can be installed in an existing area approved for wind usage i.e. the site corresponding to the first pile.

In yet a further aspect, a method for repowering an offshore wind park is provided. The offshore wind park comprises a plurality of first wind turbines mounted on first offshore wind turbine foundations. The first offshore wind turbines comprise a first substantially elongated pile driven into the seabed. The method comprises selecting one or more first offshore wind turbine foundations and removing the first offshore wind turbines mounted on the selected first offshore wind turbine foundations. The method further comprises arranging one or more second piles around at least a portion of the first piles of the selected first offshore wind turbine foundations; lowering the second piles to receive at least a portion of the first piles of the selected first offshore wind turbine foundations and driving the second piles into the seabed. In addition, second offshore wind turbines are installed on the second piles. The second wind turbines have a higher nominal power than the first wind turbines.

According to this aspect, the nominal power of a wind park may be increased reducing the installation costs.

BRIEF DESCRIPTION OF THE DRAWINGS

Non-limiting examples of the present disclosure will be described in the following, with reference to the appended drawings, in which:

FIGS. 3-7 schematically illustrate a sequence of situations that may occur during the performance of a method for retrofitting previously installed foundations for offshore wind turbines according to an example;

DETAILED DESCRIPTION OF EXAMPLES

In these figures the same reference signs have been used to designate matching elements.

In the present disclosure the expressions upper, lower, vertical, horizontal, etc. are given with reference to the intended position of the piles and the transition piece when are installed.

Throughout the present disclosure, the term "ground" encompasses the term "seabed". Throughout the present disclosure, the term "seabed" refers to the floor of a sea or an ocean in which an offshore wind turbine foundation may be installed.

Figure 1:
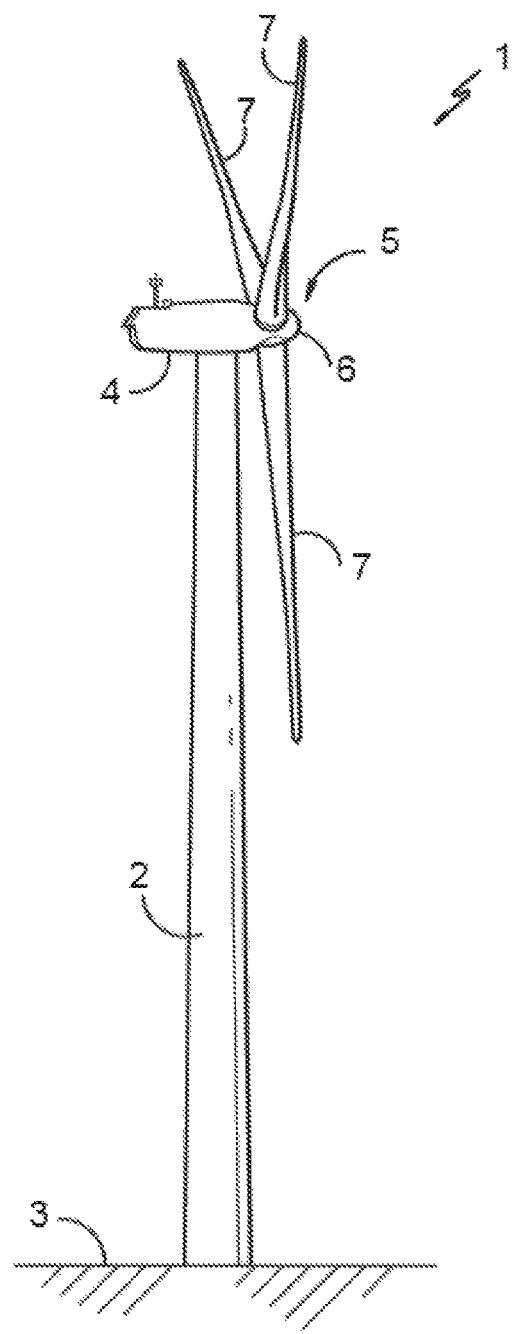
FIG. 1 illustrates a perspective view of a wind turbine according to one example.

FIG. 1 illustrates a perspective view of one example of a wind turbine 1. As shown, the wind turbine 1 includes a tower 2 extending from a support surface 3, a nacelle 4 mounted on the tower 2, and a rotor 5 coupled to the nacelle 4. The rotor 5 includes a rotatable hub 6 and at least one rotor blade 7 coupled to and extending outwardly from the hub 6. For example, in the illustrated example, the rotor 5 includes three rotor blades 7. However, in an alternative embodiment, the rotor 5 may include more or less than three rotor blades 7. Each rotor blade 7 may be spaced from the hub 6 to facilitate rotating the rotor 5 to enable kinetic energy to be transferred from the wind into usable mechanical energy, and subsequently, electrical energy. For instance, the hub 6 may be rotatably coupled to an electric generator 10 (FIG. 2) positioned within the nacelle 4 or forming part of the nacelle to permit electrical energy to be produced. In this example, the wind turbine is an onshore wind turbine, in other examples it may be an offshore wind turbine.

Figure 2:
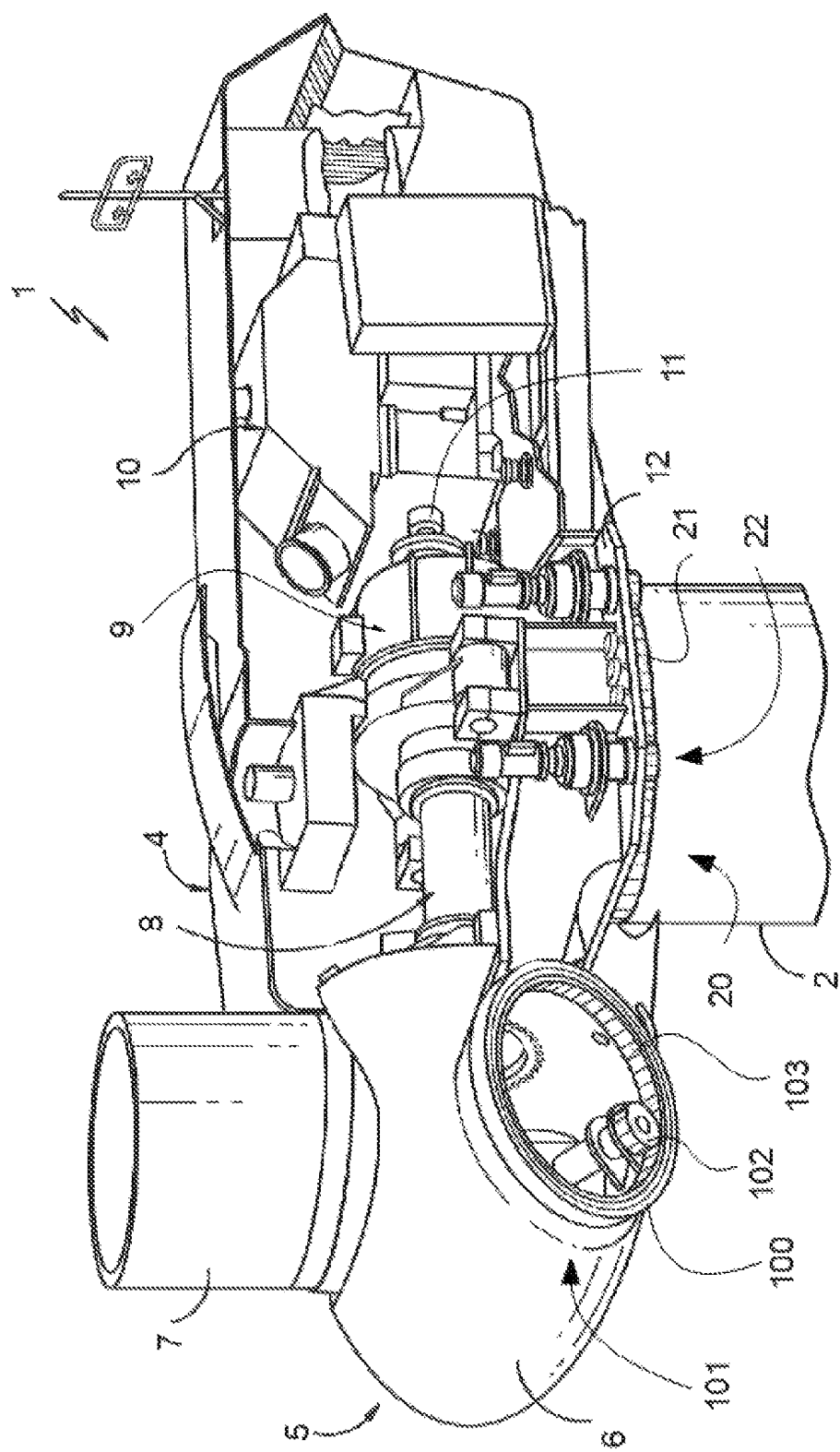
FIG. 2 illustrates a detailed, internal view of a nacelle of a wind turbine according to one example.

FIG. 2 illustrates a simplified, internal view of one example of the nacelle 4 of the wind turbine 1 of the FIG. 1. As shown, the generator 10 may be disposed within the nacelle 4. In general, the generator 10 may be coupled to the rotor 5 of the wind turbine 1 for generating electrical power from the rotational energy generated by the rotor 5. For example, the rotor 5 may include a main rotor shaft 8 coupled to the hub 6 for rotation therewith. The generator 10 may then be coupled to the rotor shaft 8 such that rotation of the rotor shaft 8 drives the generator 10. For instance, in the illustrated embodiment, the generator 10 includes a generator shaft 11 rotatably coupled to the rotor shaft 8 through a gearbox 9. In other examples, the generator may be directly coupled to the rotor hub.

It should be appreciated that the rotor shaft 8, gearbox 164, and generator 10 may generally be supported within the nacelle 4 by a support frame or bedplate 12 positioned atop the wind turbine tower 2.

The nacelle 4 is rotatably coupled to the tower 2 through a yaw system 20. The yaw system comprises a yaw bearing (not visible in FIG. 2) having two bearing components configured to rotate with respect to the other. The tower 2 is coupled to one of the bearing components and the bedplate or support frame 12 of the nacelle 4 is coupled to the other bearing component. The yaw system 20 comprises an annular gear 21 and a plurality of yaw drives 22 with a motor, a gearbox and a pinion for meshing with the annular gear for rotating one of the bearing components with respect to the other.

Blades 7 are coupled to the hub 6 with a pitch bearing 100 in between the blade 7 and the hub 6. The pitch bearing 100 comprises an inner ring and an outer ring. A wind turbine blade may be attached either at the inner bearing ring or at the outer bearing ring, whereas the hub is connected at the other. A blade 6 may perform a relative rotational movement with respect to the hub 5 when a pitch system 101 is actuated.

The inner bearing ring may therefore perform a rotational movement with respect to the outer bearing ring. The pitch system 101 of FIG. 2 comprises a pinion 102 that mesh with an annular gear 103 provided on the inner bearing ring to set the wind turbine blade into rotation.

FIGS. 3-7 schematically illustrate a sequence of situations that may occur during the performance of a method for retrofitting an offshore wind turbine foundation comprising a first substantially elongated pile in the seabed according to an example. The method is described below with reference to the sequences of situations illustrated by FIGS. 3-7.

In this example, the wind turbine foundation is an offshore wind turbine foundation and the ground is the seabed. However, in some other examples the foundation may correspond to an onshore wind turbine foundation.

In this disclosure, the term "retrofitting a wind turbine foundation" refers re-use at least a portion of an already installed wind turbine foundation. Retrofitting a wind turbine foundation may include repowering a wind turbine foundation, i.e. retrofitting an existing wind turbine foundation to receive a wind turbine with higher nominal power.

Retrofitting may also include correcting an incomplete or a failed installation of a monopile in the ground. When the expected load capacity of an installed monopile is not achieved may be regarded as an incomplete or a failed installation. This may occur when a rocky ground is found causing the monopile not to be driven at the expected depth.

In FIG. 3, a foundation 30 is provided. The foundation 30 comprises a first substantially elongated pile 31. The first elongated pile is a monopile. As used herein, a pile is an elongated connecting member, made e.g. of steel. The piles are driven several meters into a surface such as the seabed in the case of offshore wind turbines or the ground in case of onshore wind turbines. The piles may be cylindrical in shape. However, the piles may also be conical, or they may have any other suitable shape.

The first pile 31 e.g. a monopile, extends longitudinally from a lower end 311 to an upper end 312 (see also FIG. 4). The upper end 312 of the pile 31 of this figure extends beyond the water level 32. A length of the first pile 31 is thus defined between both ends. The width and the depth of the first pile or monopile may be determined by engineering analyses, taking into consideration the applied loads (e.g. side shear), seabed conditions and other factors. For example, the first pile may withstand wind turbine loads of a first type of wind turbines.

An offshore support structure e.g. a transition piece 33, may further be provided. The transition piece 33 may be attached to the upper end 312) of the first pile 31. As shown in the figure, a lower portion of the transition piece is situated below the water level 32. Particularly, in order to mount the transition piece 33 to the first pile 31, the transition piece 33 may be lifted over the first pile 31 and positioned over the upper end of the first pile 31. The transition piece 33 may include retainers (not shown) which engage the upper end (not visible) of the first pile 31 and attach the transition piece 33 to the first pile 31. This secures the transition piece 33 relative to the first pile 31.

The transition piece 33 may also comprise adjustment elements (not shown) in the form of e.g. jacks which can be used to adjust the vertical orientation of the transition piece 33 relative to the first pile 31. For example, the first pile 31 may not be strictly vertical once drilled/driven into the seabed 35 and these jacks may therefore enable the transition piece 33 to be adjusted to provide a horizontal planar surface for mounting a wind turbine tower.

A grouting chamber for receiving grout may be provided between an inner surface 331 of the transition piece 33 and an outer surface 332 of the first pile 31. The inner surface 331 of the transition piece is also shown in FIG. 4. The grouting chamber may be provided with an adhesive or a grout. This way, the transition piece 33 may be properly attached to the first pile 31.

A wind turbine tower 2 may be connected to the transition piece 33. The transition piece 33 may further comprise an upper flange (not visible). The wind turbine tower 2 may comprise a flange at its lowest portion. This flange may be bolted to the upper flange of the transition piece.

The transition piece 33 may be prefabricated prior to placing such piece over the pile 31 and it may include prefabricated auxiliary elements and installations. For example, the transition piece 33 may be provided with external tubes, ladders, platforms, access apparatus as well as boats landing equipment. The prefabrication of such apparatus and equipment may be highly beneficial in terms of both time and cost.

Offshore wind parks or farms require cables in order to transmit the electrical power generated by the wind turbines to an onshore electrical transformation center. Additionally, offshore wind turbines may require further cables which may connect the offshore wind turbines to other offshore wind turbines or to an offshore electrical transformation center. The cables for such offshore installations may pass through the external tubes forming part of the transition piece 33.

The FIG. 3 illustrates an initial situation of a method for retrofitting a wind turbine foundation. In this initial situation, the first pile 31 is shown driven into the seabed 35. Moreover, the transition piece 33 is installed over the first pile 31 and an old wind turbine tower is secured to the transition piece 31 as hereinbefore described. This wind turbine may be configured to provide an electrical power of e.g. 2 MW.

In FIG. 4, the transition piece is removed from the first pile 31. A holder may be attached to the transition piece 33. Lifting equipment, e.g. a crane, may be attached to the holder via a lifting equipment attachment. The lifting equipment may thus lift the holder and the transition piece at the same time. The lifting equipment may be provided with a steering mechanism. The steering mechanism may allow the installation and the removal of a transition piece at different angles. This way, the transition piece 33 may be hoisted and removed from the pile 31 in the direction of the arrow (arrow A). However, the pile 31 may remain driven into the seabed 35 as hereinbefore described.

Therefore, an old transition piece connected to the first pile may be removed. In examples, removing an old transition piece may comprise attaching a holder for holding the old transition piece to the old transition piece and hoisting the old transition piece using lifting equipment such that the transition piece is removed from the first pile.

Figures 5, 6:
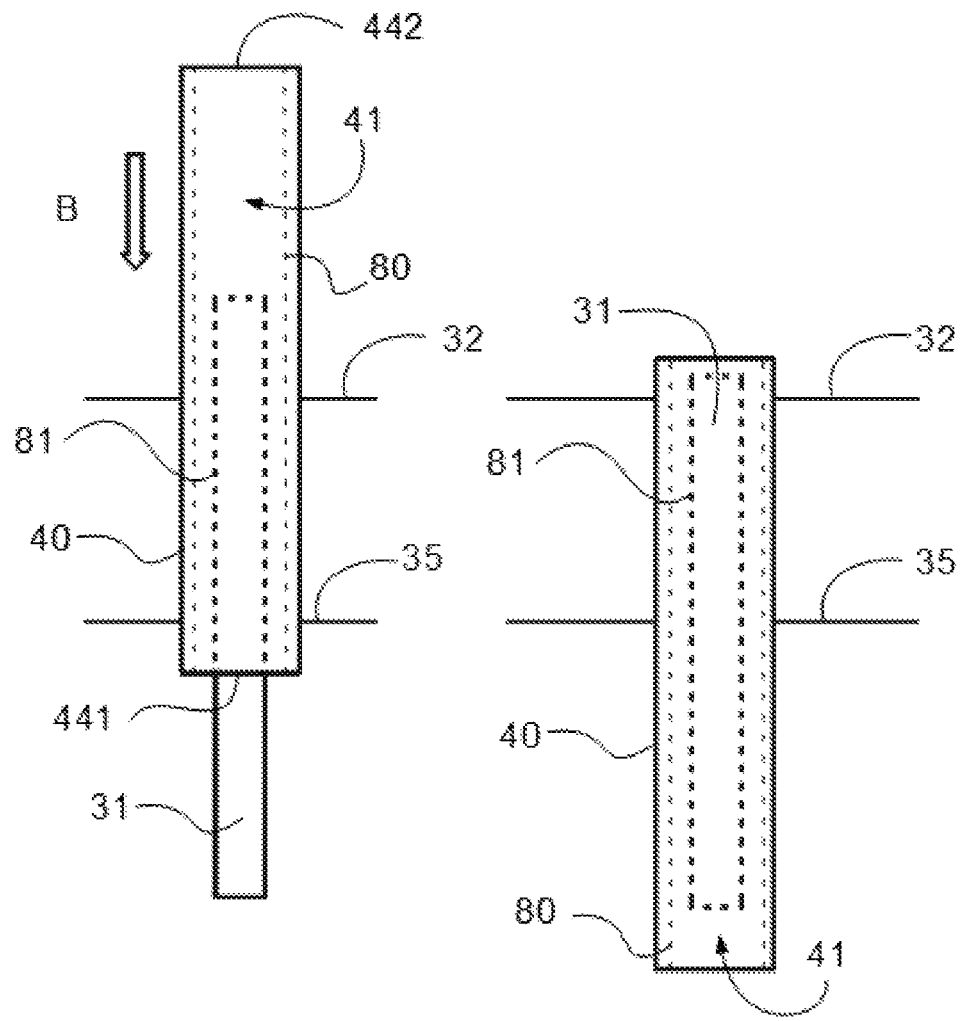

In FIG. 5, a second substantially elongated pile 40 or monopile may be provided. The second pile (and the remaining parts of the wind turbine to be installed including a transition piece and a wind turbine tower) may be placed e.g. in the main deck of the vessel and transported to the desired offshore location i.e. the offshore location corresponding to the first pile 31.

The second pile may be arranged to receive at least a portion of the first pile. The second pile may thus surround the first pile.

The second pile 40 extends longitudinally from a lower end 441 to an upper end 442 defining a length. The material of the pile may substantially be same as hereinbefore described for the first pile, e.g. steel. The outer diameter of the second pile 40 may be larger than the outer diameter of the first pile 31. The first pile extends from the upper end to a lower end defining a first length and the second pile extends from the upper end to the lower end defining a second length.

In some examples, the length of the second pile may be longer than the length of the first pile. In some of these examples, the upper portion of the second pile may stand above the upper portion of the first pile. Alternatively, or additionally, a portion of the second pile driven into the ground may be longer than a portion of the first pile driven into the ground.

In some examples, the length of the second pile and the length of the first pile may be substantially the same. The upper portions of the first and the second portions may be substantially at the same height.

In some examples, the length of the second pile may be shorter than the length of first pile. In some of these examples, a portion of the first pile driven into the ground may be longer than the portion of the first pile in the ground.

This shorter portion driven into the ground may be compensated by a higher second pile diameter. Accordingly, the contact area between the second pile and the ground may be larger than the contact area between the first pile and the ground.

Particularly, the second pile 40 may comprise an elongated channel 41 along at least a portion of the longitudinal length of the second pile 40. The elongated channel may extend from the lower end 441. In the example of FIG. 5, the elongated channel may extend from the lower end 441 to the upper end 442. A through-hole may thus be formed in the second pile 40. In some examples, the elongated channel may extend from the lower end 441 to a section below the upper portion. A blind hole may thus be formed in the second pile 40.

In some examples, the channel 41 may have the same diameter at the upper end 442 of the second pile 40 and at the lower end 441 of the second pile 40. In any case, the channel 41 may be specifically shaped and sized for receiving the first pile 31. For this purpose, the inner diameter defined by the inner sidewalls of the channel 41 may be larger than the outer diameter of the first pile 31.

Following the example, a holder (not shown) for holding a pile may be provided. As commented above, a lifting equipment may also be provided. The holder may be attached to the second pile 40 located e.g. on the deck of a vessel. The holder may be e.g. a device for clamping the pile or a lifting beam with one or more controllable slings around the pile. The lifting equipment may further be connected to the holder. The holder (and thus the second pile 41) may be hoisted and displaced towards the previously installed first pile 31.

The second pile 40 may be situated in a substantially vertical position using the lifting equipment. The channel 41 of the second pile 40 may be aligned with the upper end of the first pile 31. The elongated channel may thus be centered with respect to the first pile. At this point, the second pile 40 may be displaced in the direction of the arrow (arrow B) using the lifting equipment. The second pile may thus be lowered to at least partially shield or cover the first pile. The first pile 31 can thus be received in the lower end of the second pile 40. The second pile is thus moved with respect to the first pile until the second pile 40 is at least partially inserted into the seabed 35.

The pile 40 may be properly driven into the seabed via a hammer e.g. a hydraulic hammer. The upper end 442 of the pile 40 may have a diameter exceeding the diameter of the hammer and it may act to distribute the impact of the hammer "blow" uniformly to the pile. Along the present disclosure the term "blow" is defined as a transfer of load from the hammer to the pile 40. During a "blow", the hammer may be lifted by the pressure of a hydraulic fluid supplied to the hammer by a power unit (not shown). When the fluid pressure is removed, the hammer (not shown) descends and produces a downward stroke on the upper end 442 of the pile 40.

As shown in this figure, an inner sidewall 80 of the second pile 40 (specifically an inner sidewall 80 of the elongated channel) surrounds an outer sidewall 81 of the first pile 30.

In examples, the pile 40 may be driven into the seabed by vibration driving and boring apparatus.

Evidently, further piles may be installed around the first pile and the second piled installed in a substantially similar way.

In some examples, arranging the lower end of the elongated channel of the second pile around the first pile may comprise attaching a holder for holding pile to the second pile and connecting a lifting equipment for lifting a holder to the holder; hoisting the holder with the second pile to a substantially vertical position; and arranging a lower end of the second pile at or near an upper end of the first pile.

In examples, arranging a lower end of the elongated channel of the second pile around the first pile comprises centering the elongated channel with respect the first pile. For example, that a distance between an inner sidewall 80 of the elongated channel and an outer sidewall 81 of the first pile may be between 0.5 meters and 10 meters, specifically between 0.5 meters and 5 meters.

In FIG. 6, the first pile 31 has already been received by the channel of the second pile and the second pile 40 has already been driven into the seabed 35. As shown in this figure, an inner sidewall 80 of the second pile 40 (specifically an inner sidewall 80 of the elongated channel) surrounds an outer sidewall 81 of the first pile 30. Particularly, the sidewall 80 of the second pile is arranged radially outwardly with respect to sidewall 81 of the first pile. The sidewall 80 of the second pile may be arranged at a distance between 0.5 meters and 10 meters with respect to the sidewall 81 of the first pile.

In some examples, the second pile may substantially surround the first pile along its length. In other examples, the second pile may only surround a portion of the first pile.

In some examples, after removing the wind turbine and the transition piece, a portion of the first pile may be cut and removed from the remaining portion of the first pile. The length of remaining portion of first pile may be shorter than of the length of the first pile holding a wind turbine. In these examples, the remaining portion of the first pile may guide the second pile.

In examples, a lower end of the second pile is arranged deeper in the seabed than a bottom end of the first pile. However, in some other examples, the lower end of the second pile may be arranged in a less deep position in the seabed with respect to a lower end of the first pile. The lower end of the second pile may also be at a substantially similar deep than the bottom end of the first pile.

The second pile 40 may be suitable to support a more modern and powerful wind turbine with respect to the wind turbine previously installed on the first pile (see FIG. 3) may be provided. As a result, a new wind turbine (which is more modern and more powerful as compared with the wind turbine previously installed over the first pile) takes advantage of the best wind conditions of the offshore site corresponding to the wind turbine previously installed over the first pile. Moreover, further geotechnical studies to locate the new second pile are avoided. Additionally, due to the previously installed first pile, the seabed is more rigid and thus the stability of the foundation is improved.

Once the second pile is completely driven around the first pile, the second pile may be connected to the first pile. Grout may be inserted in at least a portion of a space between an inner sidewall of the elongated channel and an outer sidewall of the first pile. The first and the second pile may thus collaborate to withstand wind turbine loads. Attaching the second pile to the first pile may help to reduce the size of the second pile and therefore the cost of the retrofitted foundation.

Figure 7:
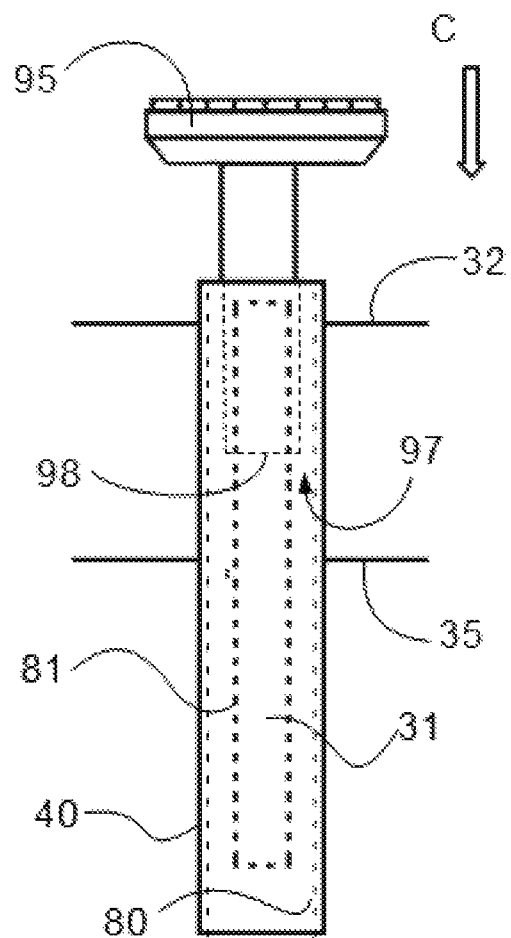

In FIG. 7, a second transition piece 95 may be provided. The second transition piece 95 may be the same or similar to the one described above.

The second transition piece 95 may be attached to the lifting equipment using a holder as hereinbefore described. The holder with the second transition piece 95 may be hoisted to a substantially vertical position to install the second transition piece 95 onto the second pile 40. In this respect, a lower portion 98 of the second transition piece 95 may be aligned and displaced towards a gap 97 formed between the outer sidewall of the first pile and the inner sidewall of the second pile in the direction of the arrow (arrow C). In this example, a bottom end of the transition piece is arranged between the first elongated pile and the second elongated pile. However, in other examples, the transition piece may partially surround the second pile.

The transition piece may further comprise brackets for temporarily support the transition piece before grouting. The brackets may be attached to an outer surface of the transition piece and they may support the weight of the transition piece 95 over e.g. an upper end of the second pile. These brackets may be supported by a lifting equipment or may be temporary connected to the second pile.

Once the second transition piece 95 is installed over the brackets an annular space between the lower portion 98 of the second transition piece 95 and an inner part of the sidewalls of the second pile. This annular space may be grouted forming a grouting chamber. The grouting chamber of the wind turbine foundation is suitable for receiving grout. As used herein, the term grout includes any cementitious settable material or mixture of settable materials. Grout is used for the support of the present wind turbine foundation.

Grout is thus introduced into the gap between the transition piece and the inner sidewall of the second pile. As a result, the second transition piece 95 may properly be attached to the second pile 40. Subsequently, a new wind turbine tower (not shown) (and the corresponding wind turbine) may be mounted on the second transition piece 95.

Alternatively, a new wind turbine tower (not shown) (and the corresponding wind turbine) may be mounted directly onto a flange of a the second monopile i.e. without a transition piece.

In summary, a bottom portion of a wind turbine tower may be arranged on the second pile. Particularly a bottom portion of a wind turbine tower may be arranged on the second pile by connecting a transition piece to the second pile and connecting the transition piece to the bottom portion of the wind turbine tower. In examples, connecting a transition piece to the second pile comprises positioning a lower portion of the transition piece in a space formed between an inner sidewall of the elongated channel and an outer sidewall of the first pile. In further examples, connecting a transition piece to the second pile comprises inserting grout in at least a portion of the space formed between the inner sidewall of the elongated channel and the outer sidewall of the first pile for connecting the second pile to the transition piece.

In examples, a wind park comprising a plurality of wind turbines mounted on foundations as hereinbefore may thus be provided.

Figure 8:
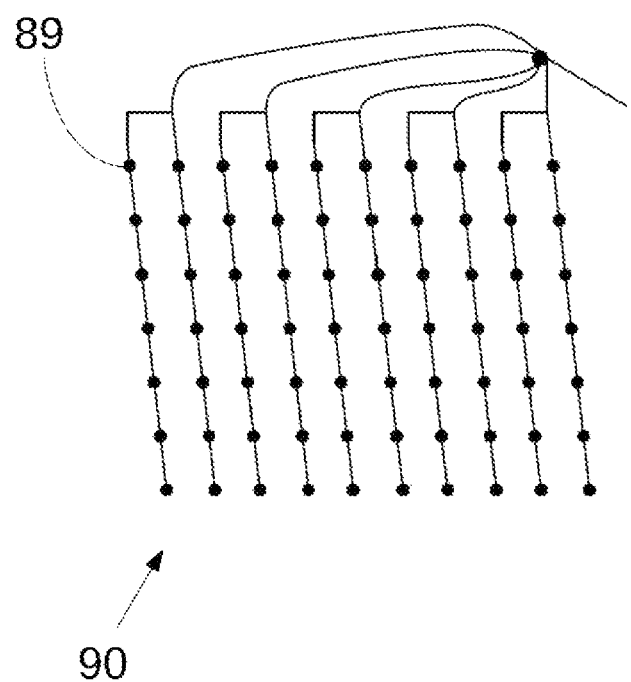
FIG. 8 schematically illustrates an example of a layout of a wind farm wherein the wind farm has not been retrofitted.

FIG. 8 schematically shows a wind farm 90 layout including a plurality of foundations supporting wind turbines. These wind turbines may be relatively old. These old wind turbines may have relatively low nominal power rate compared to the state-of-the-art wind turbine. Each foundation (and its corresponding tower and wind turbine) may be the same or similar to the one shown in FIG. 3. The layout shown in this figure comprises seventy "old" and/or "less powerful" wind turbines (each black dot 89 represents a wind turbine, a tower and its corresponding foundation). As commented, above, each of these less powerful wind turbines 89 may be configured to produce e.g. 2 MW. As a result, the electrical power provided for such wind farm may be around 140 MW.

Figure 9:
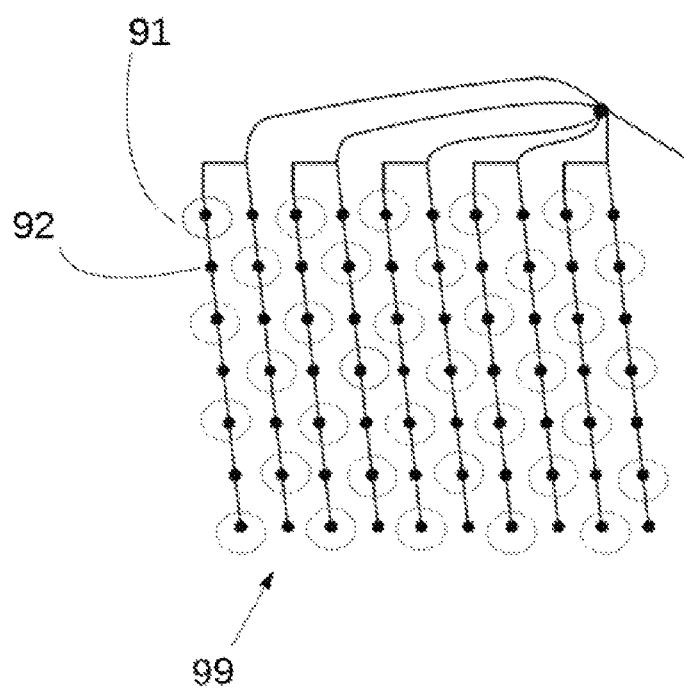
FIG. 9 schematically illustrates another layout of the wind farm of FIG. 8 after the wind farm has been retrofitted.

FIG. 9 shows a repowered wind farm 99 retrofitted with new and more powerful wind turbines using a method as hereinbefore described. The wind farm 90 of FIG. 8 has been repowered to become the repowered wind farm 99. In this figure, the reference number 91 (black dots surrounded by a circle) represents previously installed foundations retrofitted at which more powerful and efficient wind turbines have been mounted. The reference number 92 represents the locations of the previously installed wind turbines which have been removed. In this example, no wind turbines are mounted in the locations 92.

In some examples, all previously installed foundations 89 can be retrofitted to obtain retrofitted wind turbine foundations to support more powerful and heavier wind turbines.

In some examples, a plurality of previously installed foundations may be retrofitted to support new wind turbines and a plurality of installed foundations may still support old wind turbines. The wind farm may thus comprise a plurality of new wind turbines mounted on the retrofitted wind turbine foundations, i.e. comprising a second pile surrounding the first pile, and a plurality of old wind turbines mounted on the first pile.

Wind turbines mounted on the retrofitted wind turbine foundations 91 take advantage of e.g. the favorable wind conditions and/or good soil conditions of the offshore site wherein the "old" wind turbines were installed. For example, the retrofitted wind farm may comprise forty "new" wind turbines 91 each wind turbine configured to produce 12-20 MW. As a result, the wind park 99 with forty wind turbines may deliver an electrical power of 480 MW-800 MW. It is thus clear that the retrofitted wind park shown in FIG. 9 is configured to produced more electrical power as compared with the less efficient wind park shown in FIG. 8 and, all this, with less wind turbines forming part of the retrofitted wind park.

It is noted that wind turbines may require cables which may connect the offshore wind turbine to other offshore wind turbines or to a control center or to an offshore transformation center. In this respect, once the new wind turbines are installed on the previously installed foundations, the first electrical cable portions connected to the "old" wind turbines of the wind park may be substituted by second electrical cable portions connected the second wind turbines of the wind park. In examples, only a portion of the first electrical cable portions is substituted.

In examples, a method for repowering an offshore wind park comprising a plurality of first wind turbines mounted on first offshore wind turbine foundations is provided. The method comprises: selecting a portion of the first offshore wind turbine foundations comprising a first elongated pile in a seabed; installing second wind turbines on the selected first offshore wind turbine foundations, wherein the second wind turbines have a higher nominal power than the first wind turbines, and installing the second wind turbines as hereinbefore described.

Figure 10:
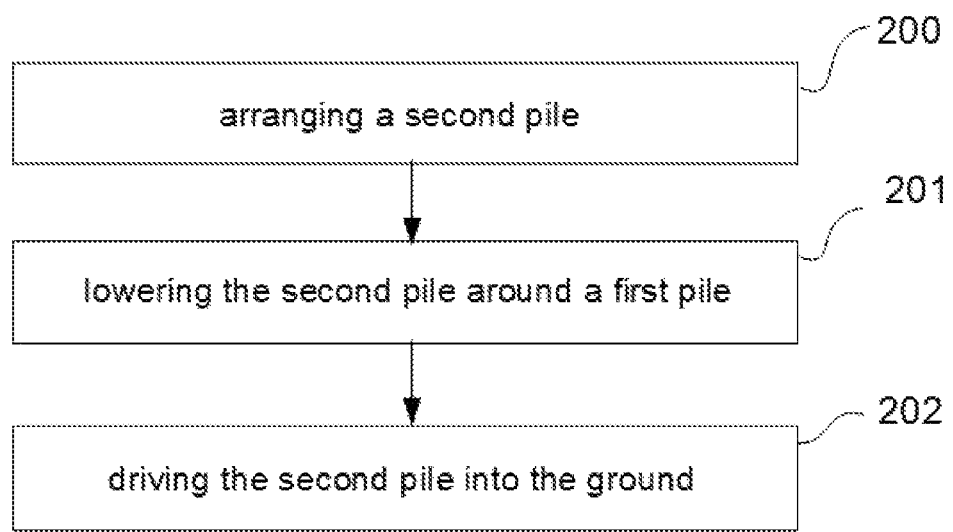
FIG. 10 is an illustration of a block diagram describing an example of method for retrofitting a wind turbine foundation comprising a first substantially elongated pile in the seabed.

FIG. 10 is an illustration of a block diagram describing an example of a method for retrofitting a wind turbine foundation comprising a first substantially elongated pile in the ground.

Block 200 represents arranging a lower end of an elongated channel of a second substantially elongated pile around the first pile. The elongated channel extends substantially along a longitudinal direction of the second pile.

The channel is configured to receive at least a portion of the first pile. The second pile may be the same as hereinbefore described.

Block 201 represents lowering the second pile such that the elongated channel surrounds at least a portion of the first pile. The second pile may thus surround the first pile.

At block 202, the second pile may be driven into the ground, e.g. the seabed. The second pile may be drilled into the ground or the seabed as hereinbefore described.

In some examples, the method of FIG. 10 may comprise further operations, e.g. attaching the first pile to the second pile, according to any of the examples herein described.

With such an arrangement, a second pile may be provided which is configured to support a relatively modern and efficient wind turbine. Additionally, this new wind turbine may be installed in the same location of the preciously installed first pile i.e. a location which can be optimal in terms of soil or wind conditions.

Figure 11:
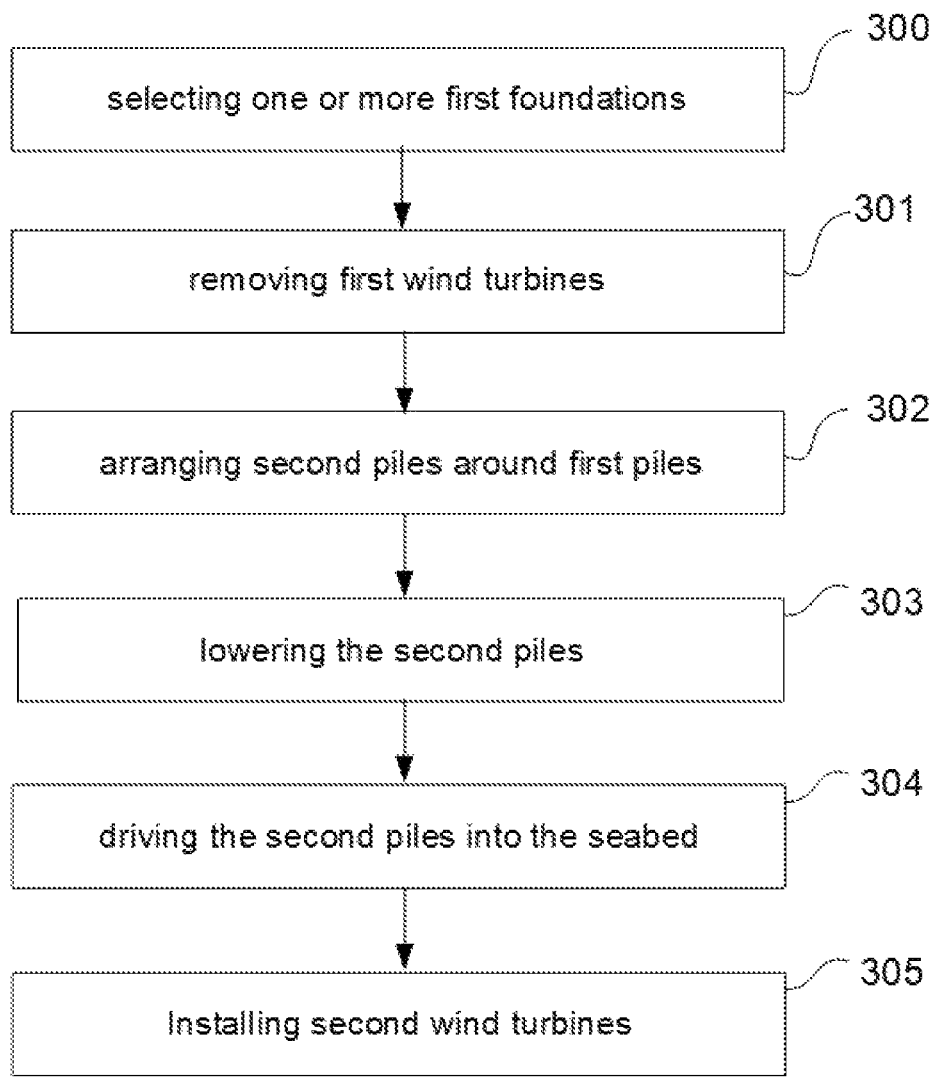
FIG. 11 is an illustration of a block diagram describing an example of a method for retrofitting an offshore wind park comprising a plurality of first wind turbines mounted on first offshore wind turbine foundations.

FIG. 11 is an illustration of a block diagram describing an example of a method for repowering an offshore wind park comprising a plurality of first wind turbines mounted on first offshore wind turbine foundations. The first offshore wind turbines comprise first substantially elongated piles or monopiles driven into the seabed.

Block 300 represents selecting one or more first offshore wind turbine foundations.

At block 301 removing the first offshore wind turbines mounted on the selected first offshore wind turbine foundations is provided. In some examples, removing the first offshore wind turbines mounted on the selected first offshore wind turbine foundations may comprise removing first transition pieces attached to the first piles of the selected first offshore wind turbine foundations.

In some examples, one portion the selected first piles may be cut and removed from the remaining portion of the selected first piles. The remaining portions may thus be still driven into the seabed.

Block 302 represents arranging one or more second piles around the first piles of the selected first offshore wind turbine foundations.

In some examples, arranging second piles around the first piles of the selected first offshore wind turbine foundations may comprise positioning a lower end of an elongated channel of the second pile surrounding an upper end of the first pile, the elongated channel extending substantially along a longitudinal direction of the second pile to receive at least a portion of the first pile.

At block 303, the second piles are lowered to receive the first piles of the selected first offshore wind turbine foundations. The first pile may be inserted in a channel extending through at least a portion of the second pile.

At block 304, the second piles are driven into the seabed. In some examples, the second pile may be attached to the first pile. Load capacity of the foundation may thus increase.

Finally, at block 305, second offshore wind turbines are installed on the second piles. The second wind turbines have a higher nominal power than the first wind turbines. Accordingly, a wind park may be repowered. The overall power production may thus increase.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method for retrofitting a wind turbine foundation, the wind turbine foundation having a first elongated pile in the ground and a first transition piece mounted atop the first elongated pile that connects to a first wind turbine tower, the method comprising:
removing the first wind turbine tower from the first transition piece;
removing the first transition piece from atop the first elongated pile;
arranging a lower end of an elongated channel of a second elongated pile around the first elongated pile, wherein the elongated channel extends substantially along a longitudinal direction of the second elongated pile and receives at least a portion of the first elongated pile therein;
lowering the second elongated pile such that the elongated channel surrounds at least a portion of the first elongated pile;
driving the second elongated pile into the ground; and
connecting the first transition piece or a different transition piece atop the second elongated pile.

2. The method according to claim 1, wherein arranging the lower end of the elongated channel around the first pile comprises:
attaching a holder to the second elongated pile for holding the second pile;
connecting a lifting equipment to the holder and hoisting the holder and the second pile to a substantially vertical position; and
arranging a lower end of the second pile at or near an upper end of the first pile.

3. The method according to claim 1, wherein arranging the lower end of the elongated channel around the first elongated pile comprises centering the elongated channel with respect the first elongated pile.

4. The method according to claim 1, wherein the second elongated pile has a cylindrical or a conical shape.

5. The method according to claim 1, wherein the first elongated pile has a first length extending from an upper end to a lower end and the second elongated pile has a second length extending from an upper end to a lower end, wherein the second length is longer than the first length.

6. The method according to claim 1, further comprising arranging a bottom portion of the first wind turbine tower or a different wind turbine tower on the first transition piece or a different transition piece that is connected atop the second elongated pile.

7. The method according to claim 1, further comprising connecting the second elongated pile to the first elongated pile by inserting grout in a space between an inner sidewall of the elongated channel and an outer sidewall of the first elongated pile.

8. The method according to claim 7, comprising positioning a lower portion of the first transition piece or a different transition piece in the space.

9. The method according to claim 1, wherein removing the first transition piece from the first elongated pile comprises attaching a holder to the first transition piece and hoisting the holder and the first transition piece using a lifting equipment.

10. The method according to claim 1, wherein the wind turbine is an offshore wind turbine and the ground is a seabed.

11. A method for repowering an offshore wind park that includes a plurality of first wind turbines mounted on first offshore wind turbine foundations, each of the first offshore wind turbine foundations having a first elongated pile driven into the seabed and a first transition piece mounted atop the first elongated pile, each of the first wind turbines having a first tower connected to the first transition piece, the method comprising:

removing the first offshore wind turbines from one or more of the first offshore wind turbine foundations by removing the first tower from the first transition piece;
removing the first transition piece from the first elongated pile;
arranging a second pile around the first elongated pile and lowering the second elongated pile to receive at least a portion of the first pile therein;
driving the second elongated pile into the seabed;
connecting a second transition piece to the second elongated pile; and
installing a second wind turbine on the second pile by connecting a second tower to the second transition piece, wherein the second wind turbine has a higher nominal power than the first wind turbine.

12. The method for repowering an offshore wind park according to claim 11, further comprising connecting the second elongated pile to the first elongated pile by inserting grout in a space between an inner sidewall of the elongated channel and an outer sidewall of the first elongated pile.

* * * * *